United States Patent
Goldfarb et al.

(10) Patent No.: US 7,120,649 B2
(45) Date of Patent: Oct. 10, 2006

(54) SYSTEMS AND METHODS FOR RECOVERY AUDIT SCOPE DETERMINATION

(75) Inventors: Eric Goldfarb, Atlanta, GA (US); Fred Saffir, Plant City, FL (US)

(73) Assignee: PRGTS, LLC, Atlanta, GA (US)

( * ) Notice: Subject to any disclaimer, the term of this patent is extended or adjusted under 35 U.S.C. 154(b) by 23 days.

(21) Appl. No.: 10/830,983

(22) Filed: Apr. 23, 2004

(65) Prior Publication Data

US 2005/0015318 A1    Jan. 20, 2005

Related U.S. Application Data

(60) Provisional application No. 60/464,871, filed on Apr. 23, 2003.

(51) Int. Cl.
*G06F 17/00* (2006.01)
*G06F 7/00* (2006.01)
*G06Q 40/00* (2006.01)

(52) U.S. Cl. ................................. 707/104.1; 705/35
(58) Field of Classification Search ............ 705/35–40
See application file for complete search history.

(56) References Cited

U.S. PATENT DOCUMENTS

| | | | |
|---|---|---|---|
| 6,442,533 B1 | 8/2002 | Hinkle | 705/36 R |
| 6,643,625 B1 * | 11/2003 | Acosta et al. | 705/38 |
| 2001/0014880 A1 | 8/2001 | Beach et al. | 705/40 |
| 2001/0034611 A1 | 10/2001 | Ooya et al. | 705/1 |
| 2001/0037216 A1 | 11/2001 | Oscar et al. | 705/2 |
| 2001/0044735 A1 | 11/2001 | Colburn et al. | 705/4 |
| 2002/0010664 A1 | 1/2002 | Rabideau et al. | 705/30 |
| 2002/0023055 A1 | 2/2002 | Antognini et al. | 705/40 |
| 2002/0040337 A1 | 4/2002 | Kikuchi | 705/36 R |
| 2002/0077945 A1 | 6/2002 | Leymann et al. | 705/35 |
| 2002/0077972 A1 | 6/2002 | Wilwerding et al. | 705/39 |
| 2002/0082891 A1 | 6/2002 | McKay et al. | 705/8 |
| 2002/0107765 A1 | 8/2002 | McCoy | 705/35 |
| 2002/0161594 A1 | 10/2002 | Bryan et al. | 705/1 |
| 2003/0023851 A1 | 1/2003 | Peha | 713/176 |
| 2003/0036918 A1 | 2/2003 | Pintsov | 705/1 |

(Continued)

FOREIGN PATENT DOCUMENTS

JP    2003186987    7/2003

OTHER PUBLICATIONS

General Accounting Office "Contract Management: Recovery Auditing Offers Potential to Identify Overpayments", Report GAO/NSIAD-99-12, Dec. 1998.*

(Continued)

*Primary Examiner*—Luke S. Wassum
(74) *Attorney, Agent, or Firm*—Sutherland Asbill & Brennan LLP

(57) ABSTRACT

The present invention enables the determination of what claim types can be written based on a client data set(s). The reverse is also true where the present invention provides the capability to determine what data sets are required to write different claim categories and types. In an illustrative embodiment, the determination of the scope of an audit in accordance with the present invention includes the determination of the claim types that can be written given a certain client data elements and/or the determination of the data elements needed to write certain claim types, both of which are based on the predefined relationships between claim types and data elements. Possible claim types can also be determined based on the client data set(s) and a permissible number of missing client data fields.

16 Claims, 14 Drawing Sheets

U.S. PATENT DOCUMENTS

| | | | |
|---|---|---|---|
| 2003/0046194 A1 | 3/2003 | McClendon, III et al. | 705/30 |
| 2003/0149645 A1* | 8/2003 | Flynn et al. | 705/30 |
| 2003/0149653 A1 | 8/2003 | Penney et al. | 705/37 |
| 2003/0158798 A1 | 8/2003 | Green | 705/30 |
| 2003/0220854 A1 | 11/2003 | Chu et al. | 705/30 |
| 2003/0225638 A1 | 12/2003 | Secola | 705/30 |
| 2004/0024616 A1 | 2/2004 | Spector et al. | 705/2 |
| 2004/0044599 A1 | 3/2004 | Kepner et al. | 705/30 |
| 2004/0133645 A1* | 7/2004 | Massanelli et al. | 709/206 |
| 2005/0027552 A1* | 2/2005 | Massanelli et al. | 705/1 |

OTHER PUBLICATIONS

Information Systems Audit and Control Association (ISACA) "IS Auditing Guideline: Use of Computer Assisted Audit Techniques (CAATs)", Document G3, 1999.*

Peters, K.M. "Netting Lost Billions", Government Executive, vol. 32, No. 12, pp. 29-35, Oct. 2000.*

Telesoft "Telesoft Corp. Provides Invoice Processing Relief", Press Release, Oct. 7, 2001.*

NHIC "Data Element Requirements Matrix", downloaded from www.medicarenhic.com, Jun. 27, 2002.*

ProAudit "What We Do", downloaded from www.proaudit.com, Aug. 5, 2002.*

107th Congress "National Defense Authorization Act for Fiscal Year 2002", Public Law 107-107.*

Daniels, Jr., M.E. "Programs to Identify and Recover Erroneous Payments to Contractors", Memorandum M-03-07, Office of Management and Budget, Jan. 16, 2003.*

Wisconsin Department of Justice "EFTS Specification", Document No. D331-116A, Release 2.3.3, Feb. 18, 2003.*

Kirix "ProfitPoint", downloaded from www.kirix.com, Mar. 15, 2003.*

Stanislawczyk, M. "OMB Issues Guidance on Recovery Audit Programs", Procurement Law Advisor, vol. 6, No. 2, May 2003.*

Maisel, J. "Recovery Audit: Now In-a-Box", downloaded from www.cashflowguardian.com, Aug. 2003.*

U.S. District Court for the Northern District of Illinois, Eastern Division, "*PRG-Schultz* v. *Kirix*", No. 03 C 1867, 2003 U.S. Dist LEXIS 25994, Sep. 19, 2003.*

U.S. District Court for the Northern District of Illinois, Eastern Division, "*PRG-Schultz* v. *Kirix*", No. 03 C 1867, 2003 U.S. Dist LEXIS 18786, Oct. 20, 2003.*

Rogers, D.L., ed. "Functionality of Recovery Audit Software Not Protected By Copyright, But May Be Protected By Trade Secrets", in Digital Discussions, vol. 3, No. 5, Oct. 2003.*

Davis, C. "Recovery Auditing: What's the Next Level?", downloaded from www.prgx.com, 2003.*

Abu-Musa, A.A. "Auditing E-Business: New Challenges for External Auditors", Journal of American Academy of Business, vol. 4, No. 1/2, Mar. 2004, pp. 28-41.*

Department of Health & Human Services (DHHS) "CMS Manual System, Pub. 100-04 Medicare Claims Processing", Apr. 23, 2004.*

Stout Causey Consulting "Accounts Payable", downloaded from www.stoutcausey.com, 2004.*

PRG-Schultz "New to Recovery Auditing", downloaded from www.prgx.com, 2004.*

PRG-Schultz "Recovery Auditing: Real Experiences, Real Solutions", powerpoint presentation, 2005.*

Connolly Consulting, Inc. "Technology", downloaded from www.cca-audit.com, 2005.*

Kirix Corporation "About Kirix", downloaded from www.kirix.com, 2005.*

Kirix Corporation "About Kirix ProfitPoint", downloaded from www.kirix.com, 2005.*

Kirix Corporation "Kirix ProfitPoint—Tour Overview", downloaded from www.kirix.com, 2005.*

PRG-Schultz "Corporate Fact Sheet", downloaded from www.prgx.com, 2005.*

Telesoft "Recovery Audit", downloaded from www.telesoft.com, 2005.*

Stout Causey Consulting "Recovery Audit Services", downloaded from www.stoutcausey.com, 2005.*

Cashflow Guardian "Audit Software Solutions", downloaded from www.cashflowguardian.com, 2005.*

Volta.net Business Directory; http://www.volta.net/Accounting/Business-to-Business/Recovery_Audit/.

* cited by examiner

FIG. 5B

SYSTEMS AND METHODS FOR RECOVERY AUDIT SCOPE DETERMINATION

RELATED APPLICATIONS

The present application claims benefit of U.S. Patent Provisional Application Ser. No. 60/464,871, filed Apr. 23, 2003, which is incorporated herein in its entirety by reference.

BACKGROUND OF THE INVENTION

I. Field of the Invention

The present invention relates generally to recovery audits, and in particular, to the determination of the possible scope of an audit as well as audit concepts.

II. Description of Related Art

Companies lose millions of dollars annually because of unpaid invoices, duplicate payment, discounts and allowances not received and general overpayments. While some of these mistakes are rectified by annual audits performed by a company's accounting firm, such audits are generally not thorough enough to identify all the recoverable loses due to erroneous business transactions. As a consequence, companies hire firms to provide recovery audit services directed at identifying overpayments and collecting the monies due their clients for such erroneous payments.

Recovery auditing involves the examining of financial, purchase, and other tracking records of client companies to identify mistakes in a transaction. If a mistake is found, then a claim is submitted to the vendor for the amount of the mistake. The claim results in a recovery of money for the client. The auditor is typically paid, at least in part, based on the amount of money they recover for their client. Because of the significant amount of data, variations among industries, and the multitude of potential claims, performing this auditing function is increasingly difficult and resource intensive.

Of particular interest is the desire to write as many claim types as possible based on the client data available for the audit. This enables the auditors to maximize their return on the audit and provides for greater recovery by the client. However, the task of correlating the client data to possible claim types can be a daunting task given the vast number of claim types and the variety of data elements received from a client, and therefore it is seldom that all possible claim types are identified. It also is the case that auditors often are not able to write certain types of claims because they are missing only a few data elements. In some cases these missing data elements could be made available to the auditor if the auditor had knowledge that having them would enable additional claim types to be written.

In addition, since different auditors miss different claims because of the subjective review they perform on the client data, the practice of quoting for a recovery audit is inconsistent from audit to audit. This may result in missed claims, and it may reduce the benefit of comparing audits for purposes of determining relative audit efficiencies since there was not a true reference point of possible claims.

Thus, there exists an unsatisfied need in the industry for an efficient means to correlate claim types to client data for use in the determination of the scope of audits or in the determination of client data to write certain claim types.

SUMMARY OF THE INVENTION

The present invention provides a computer program and related systems and computer program products that increase the efficiencies of the recovery audit process and maximize the recovery of its clients. Utilizing empirically determined knowledge, the present invention provides the capability to determine what claim types can be written based on a client data set. The reverse is also true where the present invention provides the capability to determine what data sets are required to write certain claim categories and types. As a result, the present invention enables the auditor to reduce the labor-intensive and error prone tasks associated with defining the scope of an audit, which may significantly impact the remuneration to the auditor. The present invention also optimizes the auditor's allocation of resources based on a more accurate determination of the audit scope. In an embodiment of the present invention, the determination of the scope of an audit includes the determination of the claim types that can be written given a certain client data elements and/or the determination of the data elements needed to write certain claim types, both of which are based on the predefined relationships between claim types and data elements.

In accordance with an aspect of the present invention, the present invention provides the capability to analyze claim types that may be written based on the data sets provided by the client. In the illustrative embodiment, the present invention may provide additional information about a data type or claim type during the audit scope determination.

In accordance with another aspect of the present invention, the present invention enables the auditor to view possible claim types given a certain number of missing data types so the auditor can evaluate additional claims types not available based upon the current client data sets but may be possible if additional data sets were made available. By identifying additional claim types, the client may be able to increase their recovery, which may result in additional remuneration to the auditor. In addition, the auditor may use this information when negotiating the contract with the client to obtain additional data sets so that more claim types can be written.

Significant benefits are provided by the present invention, including but not limited to the following: determine potential claims that may be written from a given data set; establish the required data based on the anticipated claims to be written; provide quality assurance to audits already concluded or in progress; train current and new auditors; provide industry knowledge and expertise through a computer program; report results based on the data and claims analysis; reduce auditing time; improve auditing efficiency; and improve audit recovery rates.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5A–5B are graphical user interfaces for providing selectable file types and associated fields in accordance with an embodiment of the present invention.

DETAILED DESCRIPTION

Figure 1:
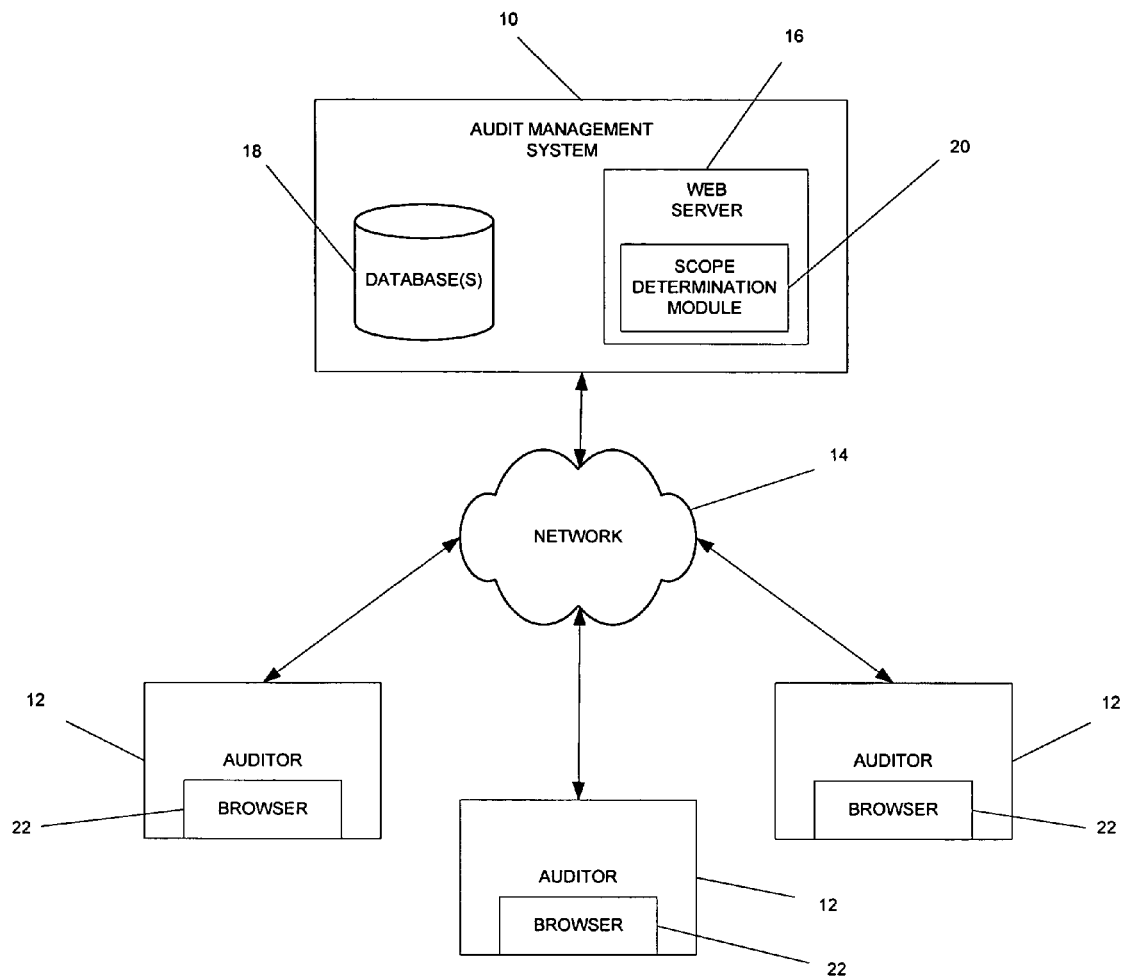
FIG. 1 is a schematic block diagram illustrating an audit management system in accordance with an embodiment of the present invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to screen shots of illustrative user interfaces and flowchart illustrations of methods, apparatus (i.e., systems) and computer program products according to an embodiment of the invention. It will be understood that each block of the flowchart illustrations and combinations of blocks in the flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The present invention enables the determination of what claim types can be written based on a client data set(s). This is achieved, at least in part, by using an empirically determined relationship between each claim type and the data elements (also referred to herein as data fields) needed to write that claim type. The reverse is also true where the present invention provides the capability to determine what data sets are required to write different claim categories and types using an empirically determined relationship between each claim type and the data sets needed to write that claim type. While a few of these relationships have become widely known throughout the audit recovery industry, many may still be considered proprietary. In either case, the relationship is defined, typically in the form of a relational database, and used for purposes of determining the possible audit scope. For example, a claim for duplicate payment may require the following data elements: vendor AP number, invoice number, invoice date, invoice amount, payment amount and batch number. Without each of these data elements, this claim type cannot be written.

In an illustrative embodiment, the determination of the scope of an audit in accordance with the present invention includes the determination of the claim types that can be written given certain client data elements and/or the determination of the data elements needed to write certain claim types, both of which are based on the predefined relationships between claim types and data elements. Possible claim types can also be determined based on the client data set(s) and a permissible number of missing client data fields. That is, the present invention can identify possible claim types based on an incomplete data set or one that is close, but not fully complete to support a claim type. Upon identifying and accessing the incremental data elements, the auditor may then be able to write the additional claims.

With reference to the figures, FIG. 1 is a block diagram illustrating an exemplary operating environment for implementation of certain embodiments of the present invention. The exemplary operating environment encompasses an audit management system 10 and a plurality of auditor devices 12, each of which are configured for accessing and reading associated computer-readable media having stored thereon data and/or computer-executable instructions for implementing the various methods of the present invention. The auditor devices 12 are in electronic communication with the audit management system 10 via a network 14, which may include one or more Local Area Networks (LANs) and/or one or more Wide Area Networks (WANs), and in the illustrative embodiment includes the Internet. Generally, network devices and systems include hardware and/or software for transmitting and receiving data and/or computer-executable instructions over a communications link and a memory for storing data and/or computer-executable instructions. Network devices and systems may also include a processor for processing data and executing computer-executable instructions, as well as other internal and peripheral components that are well known in the art. As used herein, the term "computer-readable medium" describes any form of memory or a propagated signal transmission medium. Propagated signals representing data and computer-executable instructions are transferred between network devices and systems.

The audit management system 10 includes a web server 16 and a database 18. The components of the claim processing system 10 may be collocated on a single computing device, such as a server or personal computer, or distribute over a LAN and/or WAN between multiple computing devices. Further, the components of the audit management system 10 may be distributed themselves, such as database 18, which may comprise multiple databases operating under the control of a single or multiple database applications.

The web server 16 comprises a scope determination module 20. The scope determination module 20 comprises the logic implementing the audit scope determination functionality of the present invention, as described herein. The scope determination module 20 interfaces with the database 18 to provide the auditors with audit scope information. The database 18 includes the empirically determined relationship between each claim type and the data sets needed to write that claim type. Specifically, the database 18 includes two types of information, claim types and data elements. Claim types are classifications for the type of claims found by the auditor, which may vary from company to company. In most cases, the claim types will have been developed empirically by the auditor in the performing of recovery services for its clients. The data elements represent the set of data types that the auditor typically finds in its client data. The relationship between the claim types and the data elements is included with the data elements in the database 18, such as with a relational database as well known in the art. For example, the database may be Microsoft Access or any other suitable databases such as Microsoft SQL Server, XBase, Oracle or DB2.

The auditor devices 12 may be any suitable computing device with communication means suitable for interfacing with the network 18. The communication link between these devices and the network 18 may be wired, wireless, or a combination thereof. The devices themselves may be personal computer, thin client computers, PDAs, laptops, tablet computers, or any other suitable computing device. In the illustrative embodiment, the devices 12 include a web browser application 22 such as Microsoft Explorer or Apple Safari to facilitate communication with the audit management system 10, for example, over the Internet.

The operation and functionality of the audit management system 10 will now be further described in the context of an illustrative embodiment provided in the flow diagrams and user interfaces of FIGS. 2–18. For illustrative purposes, the auditor will represent a recovery audit firm and the client represents the business entity being audited. However, it will be appreciated that the auditor may be employed by the client and the process described herein performed internally.

Figure 2:
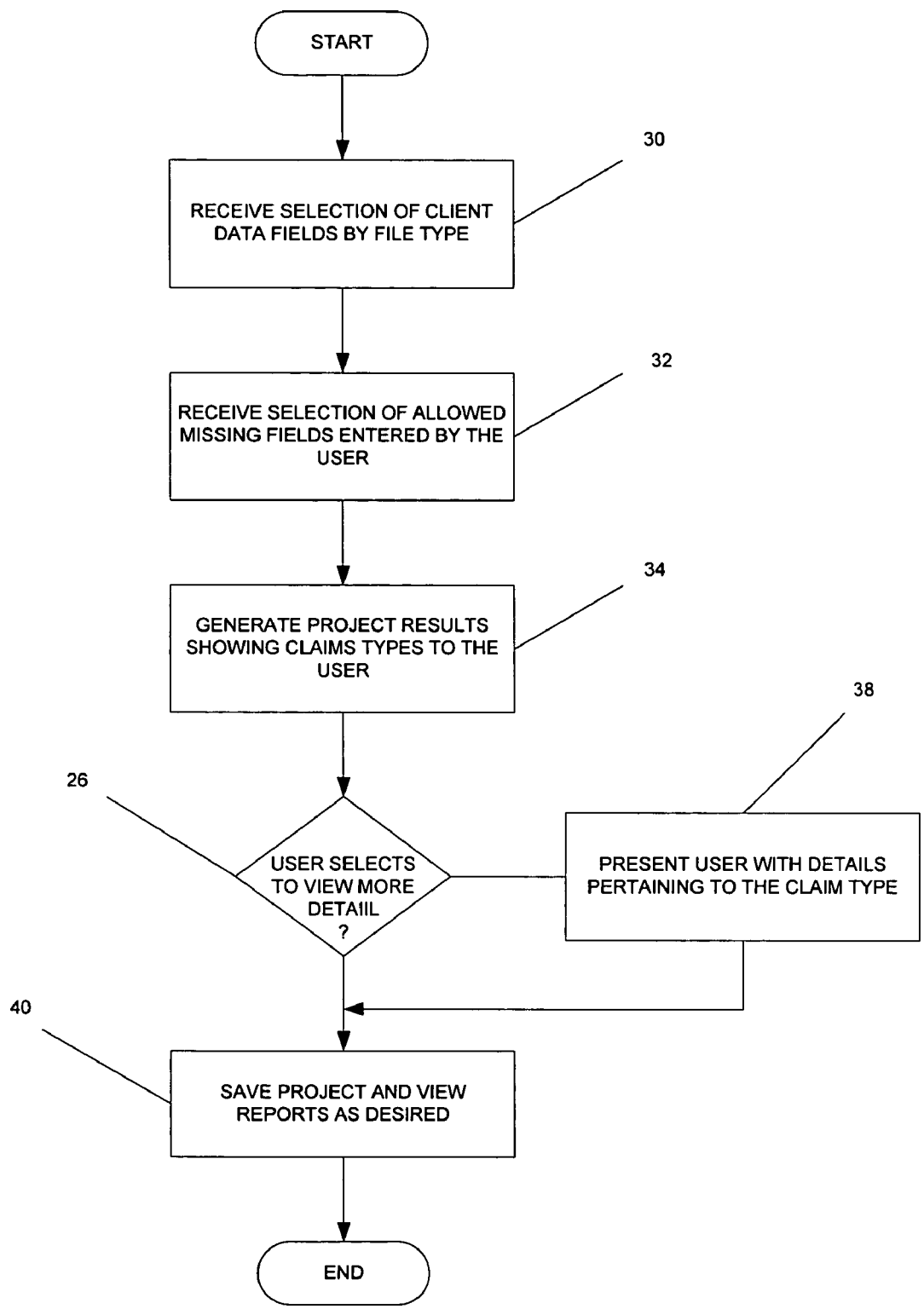
FIG. 2 is a flow diagram of the operation of an audit management system in accordance with an embodiment of the present invention.

FIG. 2 shows a flow diagram illustrating a process implemented by the claim processing system of FIG. 1, according to one embodiment of the present invention. As shown in FIG. 2 the process begins at step 30 with the receipt of the selection of data fields by file type entered by the auditor. Selection by file type is advantageous when the auditor knows what data he or she has and wants to discover what claims may be written. This is especially useful when performing quality assurance checks to make sure the full scope of claim types have been written. Further, file type can be used in identifying those claims that might be missing a few data elements, so that the auditor will know how to target additional data acquisition to write those claims and therefore expand the scope of their audit. The scope determination module then receives the selection of an allowable number of missing client data fields entered by the auditor, as indicated by step 32. This allows the auditor to receive the results that include claims that they might be able to write with additional data fields. Next at step 34, the scope determination module generates a listing of possible claims types given the selected client data fields and allowable missing data fields. The auditor may then select to view more detail about any of the listed claim types, as indicated by step 36, in which case the auditor will be presented with details pertaining to that claim type, as indicated by step 38. Lastly, the auditor has the options of saving the project and viewing reports, as indicated by step 40.

Figure 3:
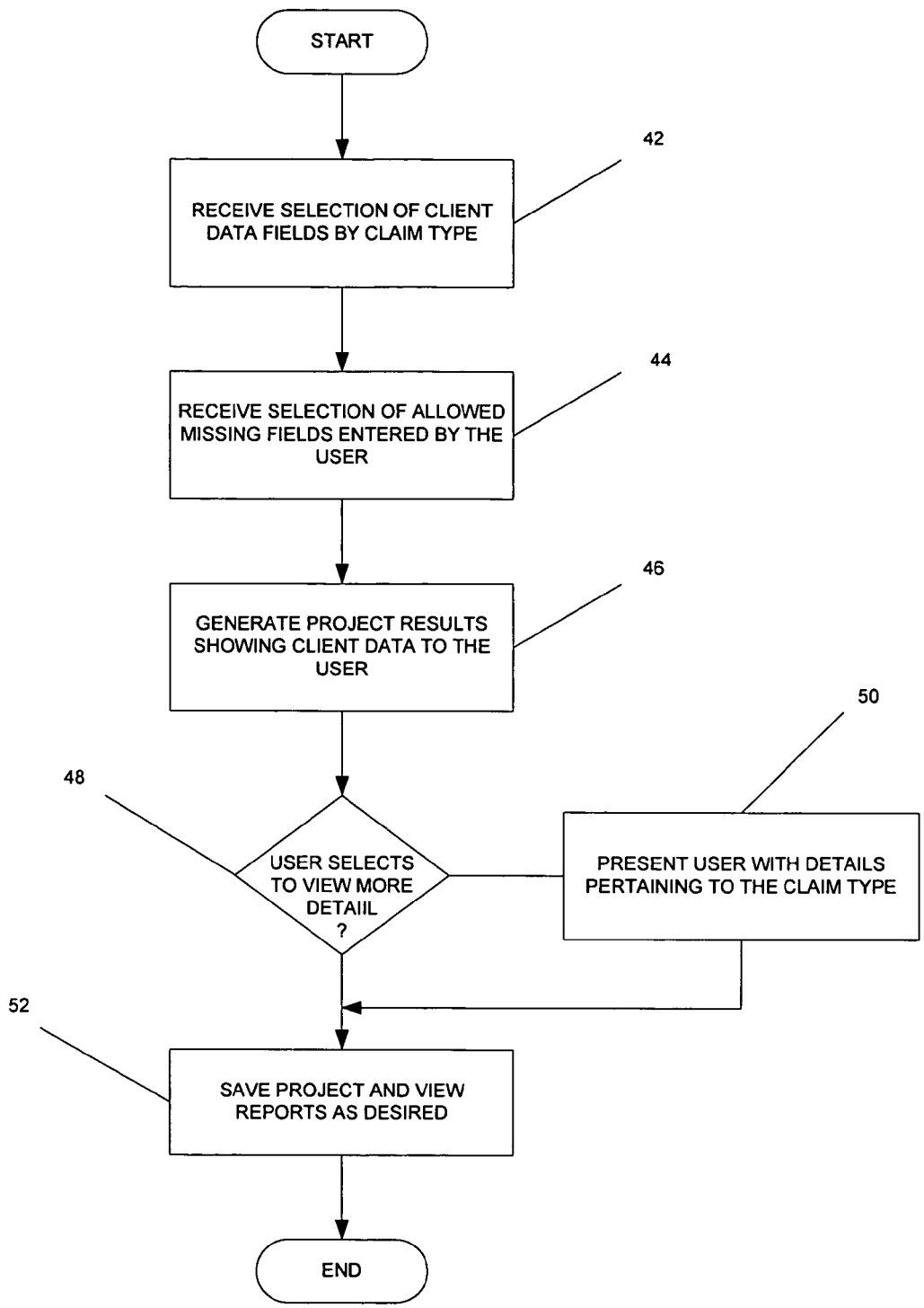
FIG. 3 is a flow diagram of the operation of an audit management system in accordance with another embodiment of the present invention.

An alternative embodiment of the present invention is illustrated in FIG. 3. In particular, the scope determination module receives the selection of the client data fields by claim type rather than by file type, as indicated in step 42. Selection by claim type is advantageous when performing data acquisition. If an auditor knows what claim types he or she is contractually obligated to investigate, he can use the present invention to insure the proper data is acquired. Next, at step 44, the scope determination module receives the selection of an allowable number of missing fields. As stated above, this allows the auditor to identify claims that they might be able to write with additional data fields. Next, at step 46, the scope determination module generates a listing of possible claims types given the selected client data fields and allowable missing data fields. The auditor may then select to view more detail about any of the listed claim types, as indicated by step 48, in which case the auditor will be presented with details pertaining to the that claim type, as indicated by step 50. Lastly, the auditor has the options of saving the project and viewing reports, as indicated by step 52.

According to one aspect of the present invention, the scope determination module 20 may comprise a software product for generating graphical user interfaces via the web server 16. Therefore, it will be understood that each of the accompanying graphical user interfaces may be implemented by computer program instructions. These computer program instructions may be loaded into a general purpose computer, special purpose computer or other programmable data processing apparatus to produce a machine, such that the instructions which execute in the computer or other programmable data processing apparatus create means for implementing the functions illustrated by and described with reference to the illustrative user interfaces provided herein.

The computer programmable instructions may also be stored in a computer-readable memory that can direct a computer or other programmable data processing apparatus to function in a particular manner, such that the instruction stored in the computer-readable memory produce an article of manufacture including instructions means that implement the functions illustrated by the interfaces. The computer program instruction may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified herein.

FIGS. 4–18 illustrate some of the graphical user interfaces provided by the audit management system 10 of the present invention for the determination of the scope of an audit based on designated client data sets. It will be appreciated that the graphical user interfaces are used by the auditors for this determination process. The interfaces may be web-based such that the auditors can access the interfaces via the Internet, at any time, from any location. It will be appreciated with reference to the interface that some of the functions described herein are only available to some users accessing the interfaces, typically based on user log-in information.

The auditors are described herein as general users, and the process of determining of the scope for an audit is referred to as a project. A file is the name of the file that may be received from a client. The data fields are the names of the fields typically found on these files. A claim is the identification of an instance where the client did not pay the proper amount, often an amount greater than obligated. For instance, an advertising file type will have several typical field names such as UPC, ad number, or vendor number. These fields, when properly audited, may help point to an claim where an advertising allowance was not properly received.

As an initial matter, the scope determination module may include various security mechanisms including, but not limited to, user authenticated. With security, the program may be ported to a distributed architecture allowing it to be used in remote sites without disclosing the core business logic required for the program operation.

Figure 4:
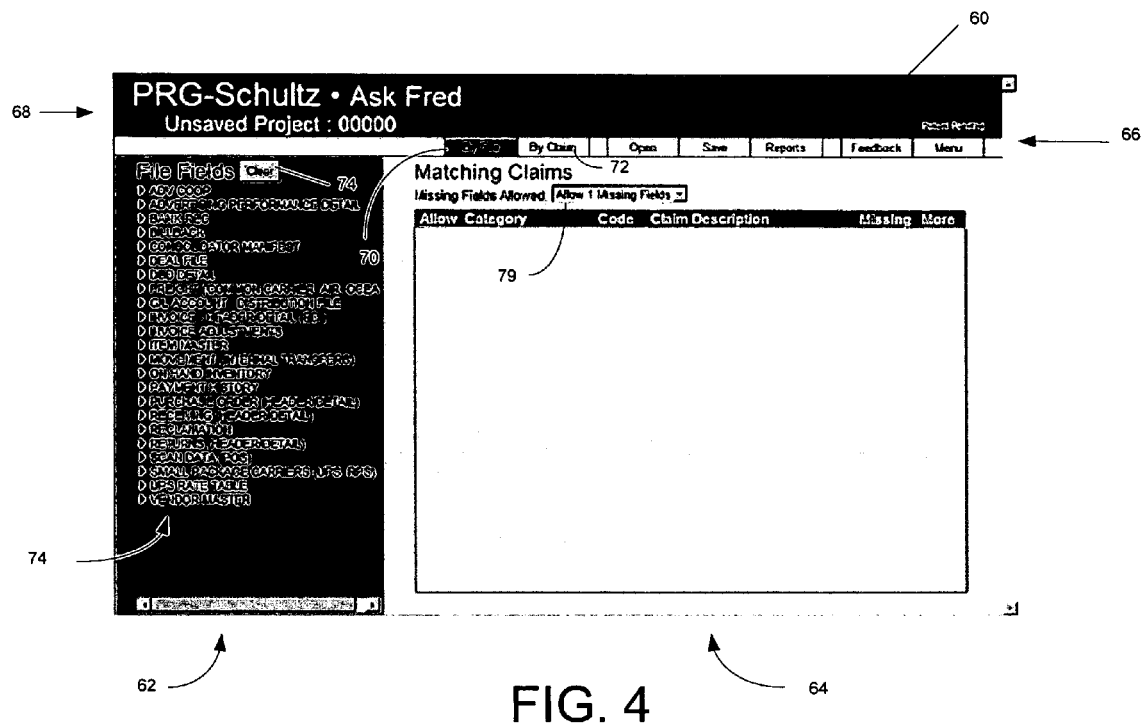
FIG. 4 is a graphical user interface for providing project information based upon selectable file type in accordance with an embodiment of the present invention.

With reference now to FIG. 4, once the user has gained access to the audit manager system 10, an user interface 60 generated by the scope determination module 20 is presented to the user as a main server. The user interface 60 includes two sections, a data fields section 62 that includes the selectable data fields for the project and a matching claims section 64 that includes the results of the project, that being a listing of the possible claim types. In addition, the user interface 60 includes a menu bar 66 and project identifiers 68.

The menu bar 66 includes a By File button 70, which is selected in FIG. 4, and a By Claim button 72. These two buttons define the configuration of the data fields section 62. When the By File button 70 is selected, the data fields section 72 provides selectable file fields from which the user can select, as illustrated. Conversely, when the By Claim button 72 is selected, then the data fields section 62 provides selectable claim fields, as discussed below.

Generally, upon selection of the By File button 70, the user will want to select the Clear button 74 which deselects all the data file fields presented to the user. The user may then select data file fields provided, usually by the client. Typically, the user will examine the data provided to determine what data fields (also referred to as data elements) exist against which an auditor may be able to write claims. In some cases, the client data fields will need to be translated and mapped to the data fields used in the program. This functionality may be done manually or incorporated into the present invention.

Figure 5A:
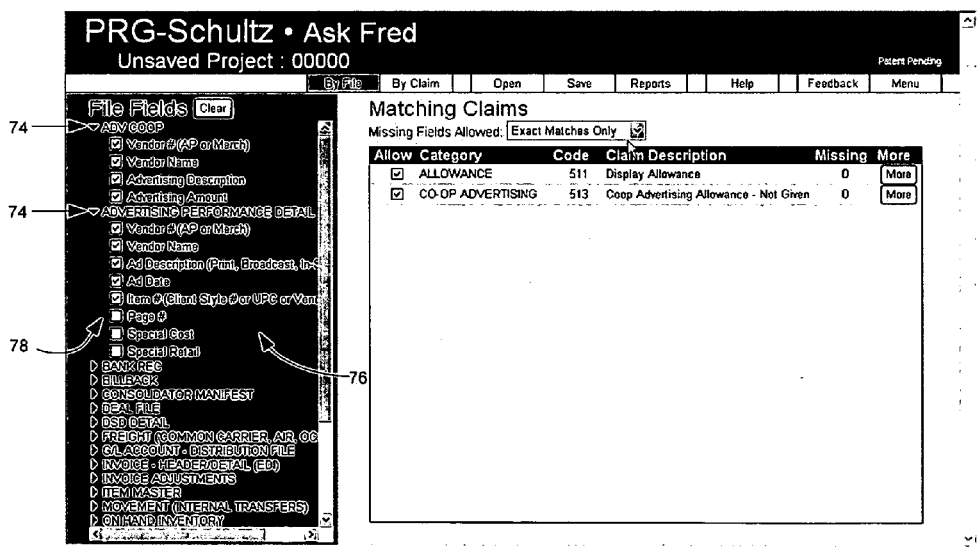

To select a data element, the user selects a file name 74 to expand the list of data file fields 76 available for that file, as illustrated in FIG. 5, and then select the check boxes 78 to the left of the data file fields 76. Note, in the illustrative interface the data elements have been selected at random in FIG. 5A.

The user may then select the number of data fields the user is willing to allow in the listing of matching claims. For example, in matching claims section 64, the user may select the Missing Fields Allowed pull-down menu 79 to reveal several options. In the illustrative embodiment shown in FIG. 5B, the user may select from "Exact Matches Only" to find the type of claims that can be generated from the selected data file fields, "Allow 1 Missing Fields" to find the types of claims that can be found from the selected fields if one data file field that is currently not being provided by the client is provided, "Allow 2 Missing Fields" to find the types of claims that can be found from the selected fields if two data file fields that are currently not being provided by the client is provided, and "Allow 3 Missing Fields" to find the types of claims that can be found from the selected fields if three data file fields that are currently not being provided by the client is provided. However, it will be appreciated the present invention is not limited to a particular list of missing fields allowed. More or fewer options may be provided.

Figure 6:
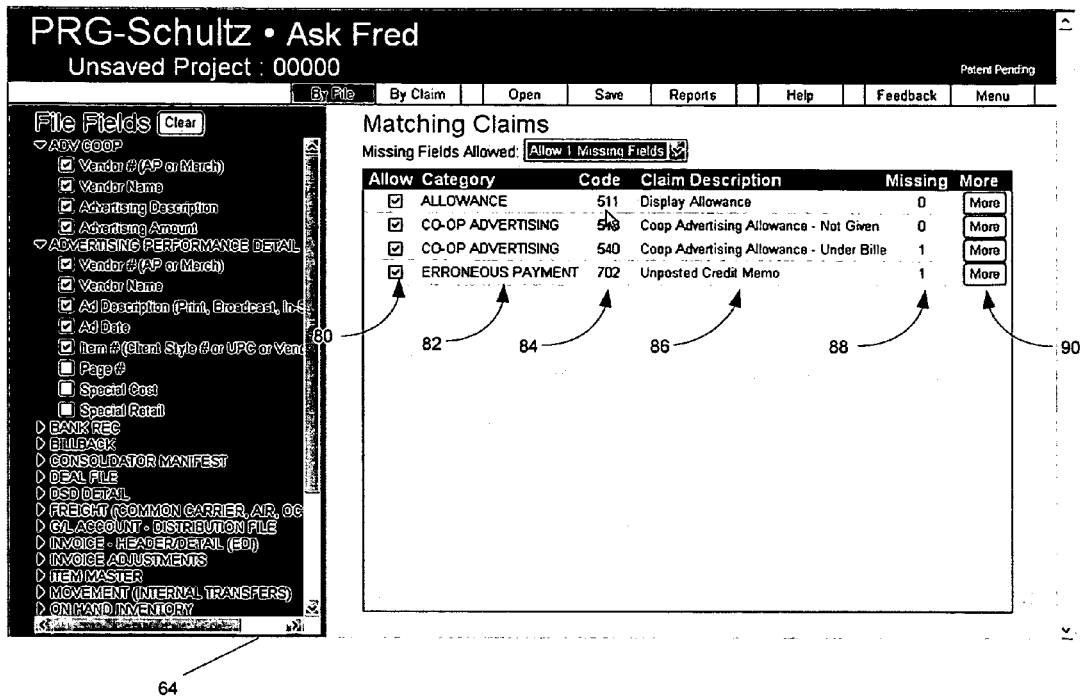
FIG. 6 is a graphical user interface for providing matching claims in accordance with an embodiment of the present invention.

Once the user makes the selection of missing fields allowed, the results are automatically generated and presented to the user in the matching claims section 64 of the user interface 60, as illustrated in FIG. 6. The Allowed column 80 comprises selectable boxes that when selected indicate that the client and vendor give permission for this type of claim to be processed for this audit. If the client and/or vendor have not agreed to allow this type of claims, then the box is left clear. The Category column 82 provides the type of claim that has the potential to be generated for the audit based upon the selected fields, or the type of claim that can be generated assuming the missing field(s) can be provided by the client. The Code column 84 provides the code for the claim type. The code is an internal claim code associated with the claim that is used for all clients. The Claim Description column 86 provides a description of the claim and the Missing Column 88 indicated the number of missing data field that were not selected, that is, not provided by the client. The More buttons associated with each claim type provide more detailed information about the project results, including which fields are missing, or access to a knowledge base with more information about the potential claim type, as discussed in greater detail below.

Figure 7:
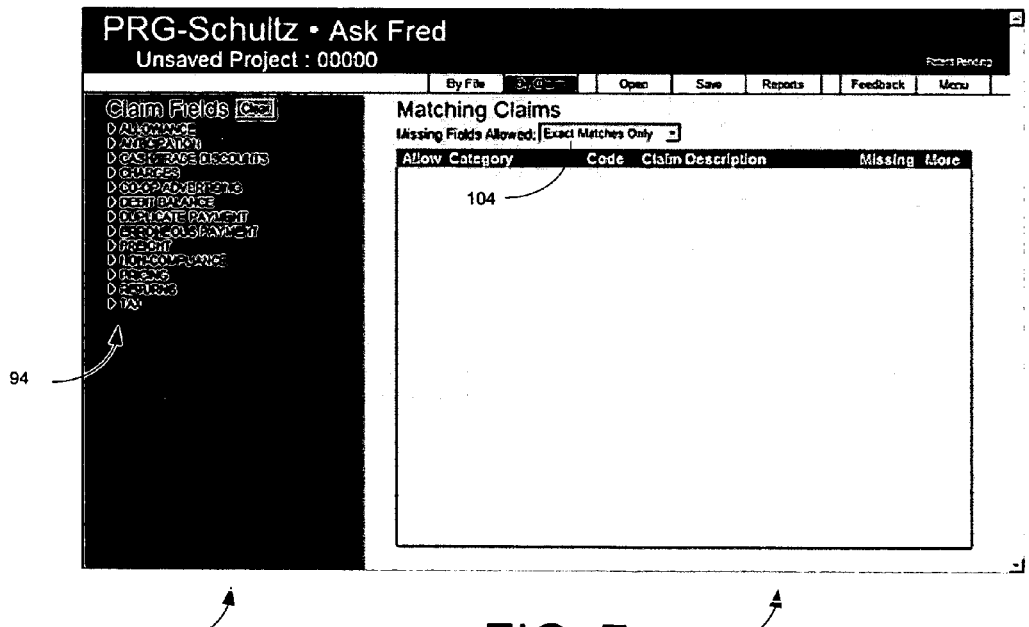
FIG. 7 is a graphical user interface providing project information based upon claim type in accordance with an embodiment of the present invention.
Figure 8:
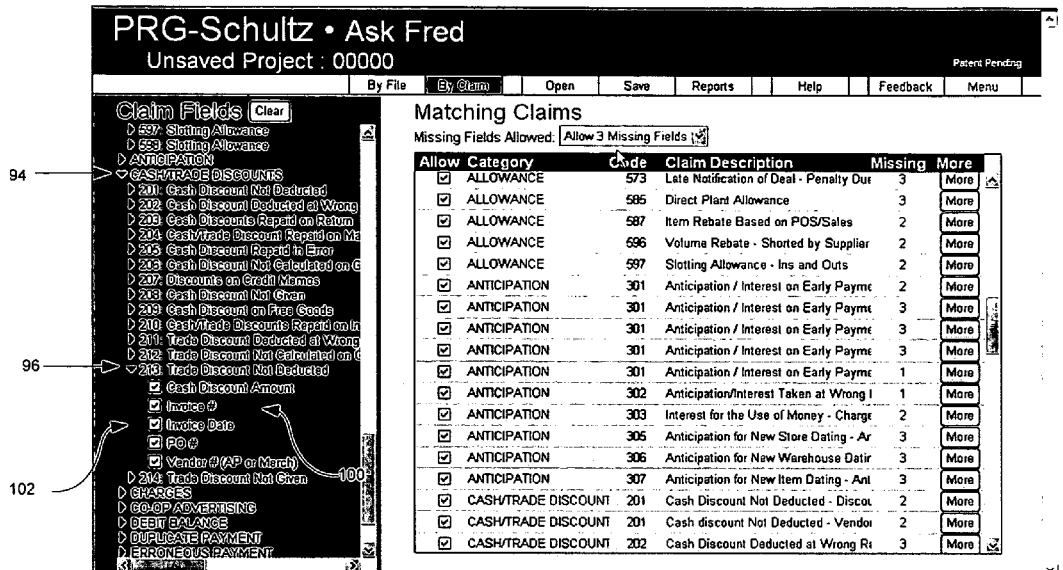
FIG. 8 is a graphical user interface providing selectable claim types and associated fields in accordance with an embodiment of the present invention.

The user may also select the By Claims button 72 of the user interface 60 to have the option of selecting the available client data fields by claim type, as illustrated in FIG. 7. When selecting data fields by claim type, the data fields section 92 of the user interface provides a listing of claim types 94, which can be selected to expand to show the list of associated claims 96, as illustrated in FIG. 8. The user can then select the data fields 100 corresponding to the data provided by the client for the audit by selecting the corresponding check boxes 102 to the left of the data fields.

Figure 9:
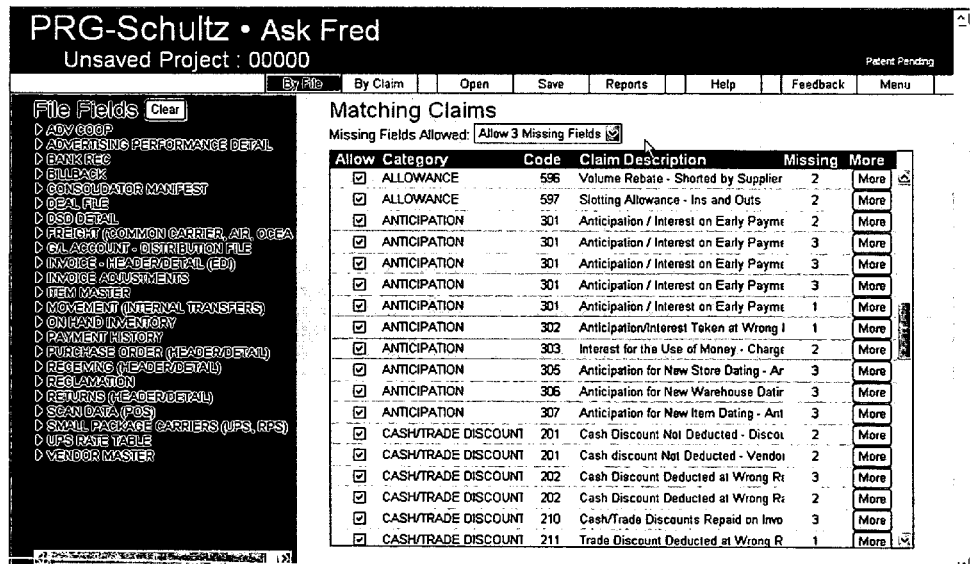
FIG. 9 is a graphical user interface providing matching claims in accordance with an embodiment of the present invention.

The user may then select the number of missing fields allowed utilizing the Missing Fields Allowed pull-down menu 104, which once a selection is made, caused the results to be automatically generated and present in the Matching Claim section 106, as illustrated in FIG. 9.

Figure 10:
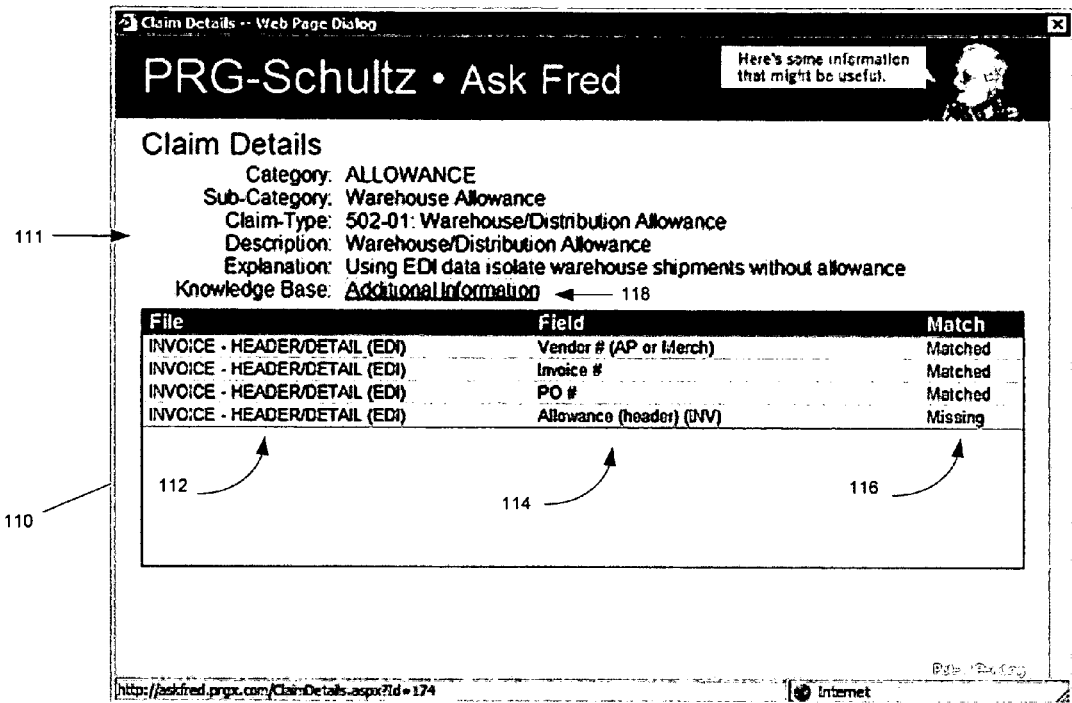
FIG. 10 is a graphical user interface providing more information about potential claim types in accordance with an embodiment of the present invention.
Figure 11:
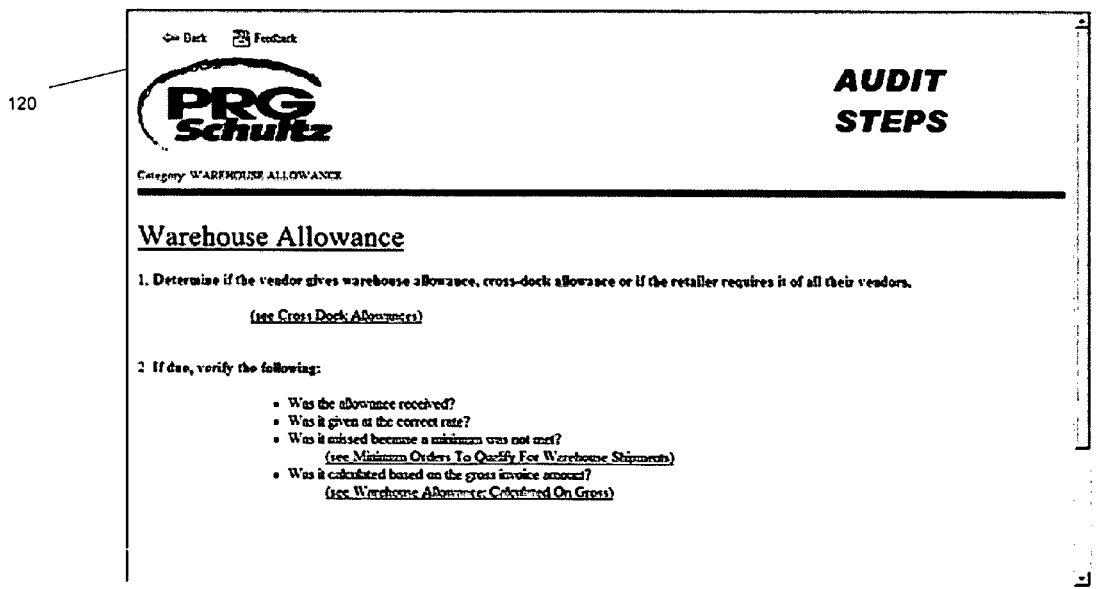
FIG. 11 is a graphical user interface providing a Knowledge Base for additional information in accordance with an embodiment of the present invention.

If the user selects the More button associated with one of the claim types listed in the results shown in the Matching Claim section, regardless of whether the results are generated for the project by file type or claim type, the user is presented with a Claim Details interface 110, as illustrated in FIG. 10. The user interface 110 provides some general information 111 about the claim type and several columns of more specific information. In the illustrative embodiment, the columns include a File column 112 which identifies the client file containing the fields selected for the project, a Field column 114 which identifies the selected field in the file, and a Match Column which indicated if the field is provided by the client or missing. The general information includes a link 118 to a knowledge base for additional information, which may take the user to a web-based interface such as user interface 120 of FIG. 11.

Figures 12, 13:
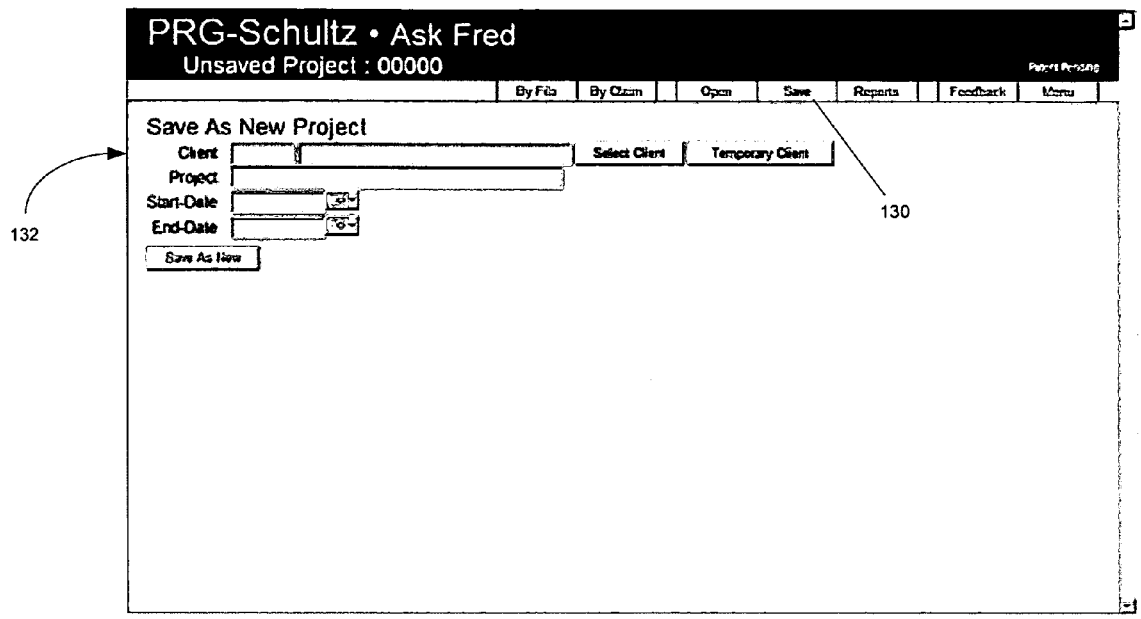
FIG. 12 is a graphical user interface for saving a project in accordance with an embodiment of the present invention.
FIG. 13 is a graphical user interface for opening a project in accordance with an embodiment of the present invention.

The present invention enables the user to maintain projects. For example, the user may select to save a project by selecting the Save button 130 in the menu bar 66 of the user interface 60, as illustrated in FIG. 12. The user may save the project before continuing to produce reports and analysis. Saving the project allows the user to return to it at a later date. The user merely inputs the requested information 132 and the project will be saved for future reference. The project may be saved locally, such as on database 18, or remotely. The user may open a saved project by selecting the Open button 136 in the menu bar 66, which results in the listing of individual projects that the user has configured, as illustrated in FIG. 13. Projects are saved versions of a particular data set checklist that the user inputs into the program. The user can open any one of the projects listed by selecting the associated Project Open button 138.

Figure 14:
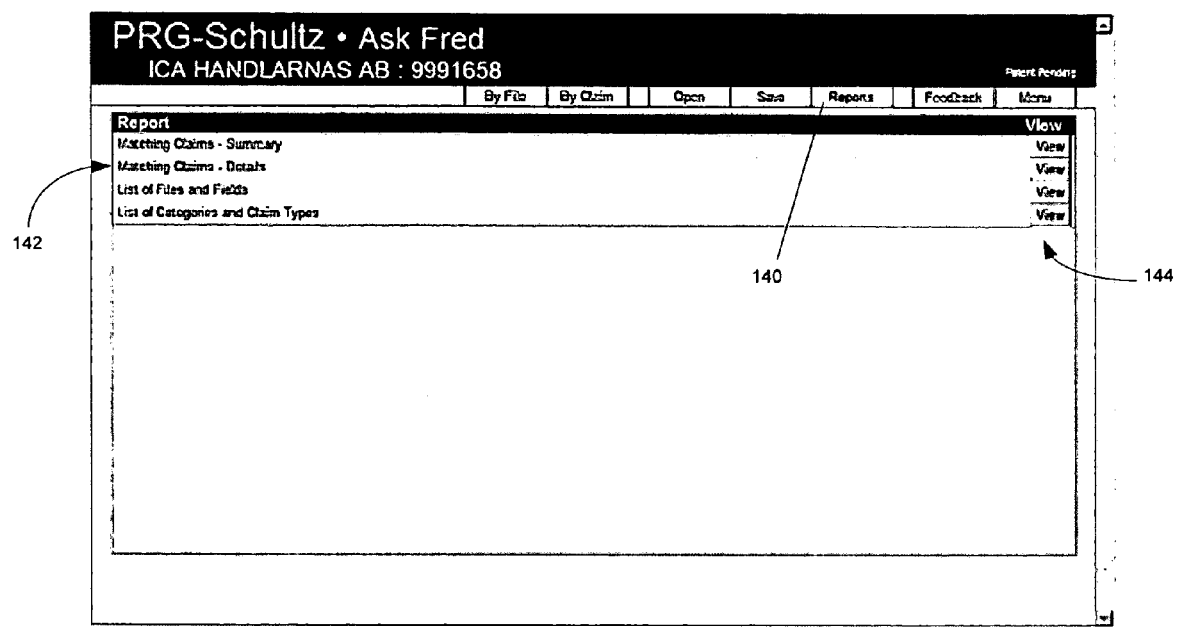
FIG. 14 is a graphical user interface for selecting a report in accordance with an embodiment of the present invention.
Figure 15:
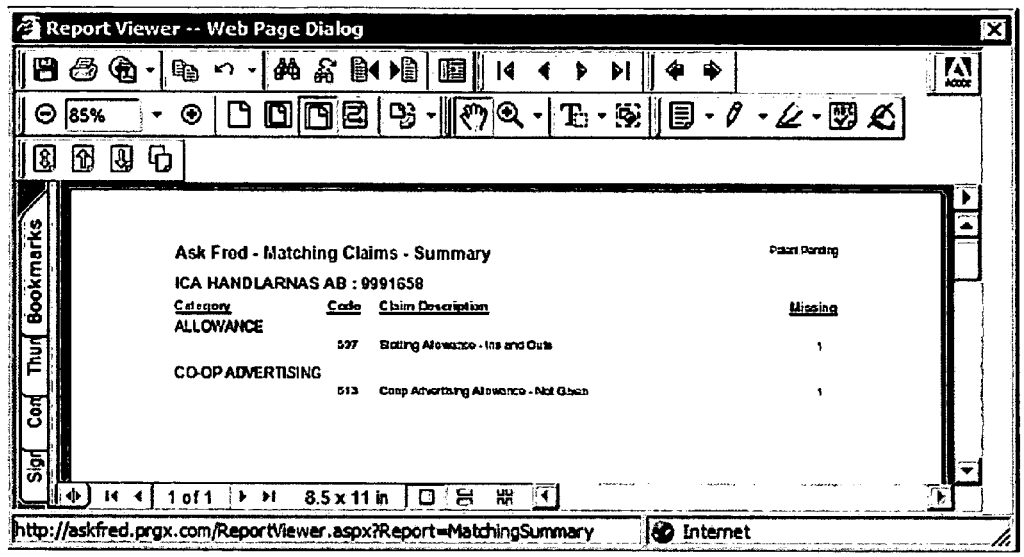
FIGS. 15–18 are illustrative reports in accordance with an embodiment of the present invention.
Figure 16:
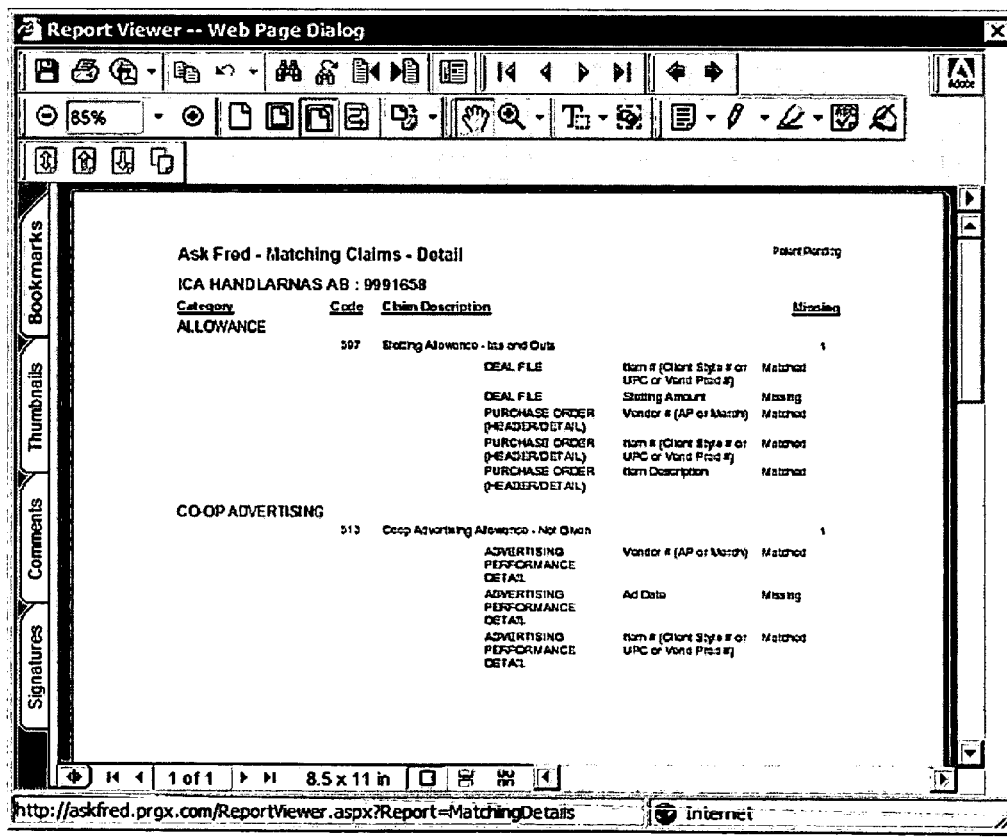
Figure 17:
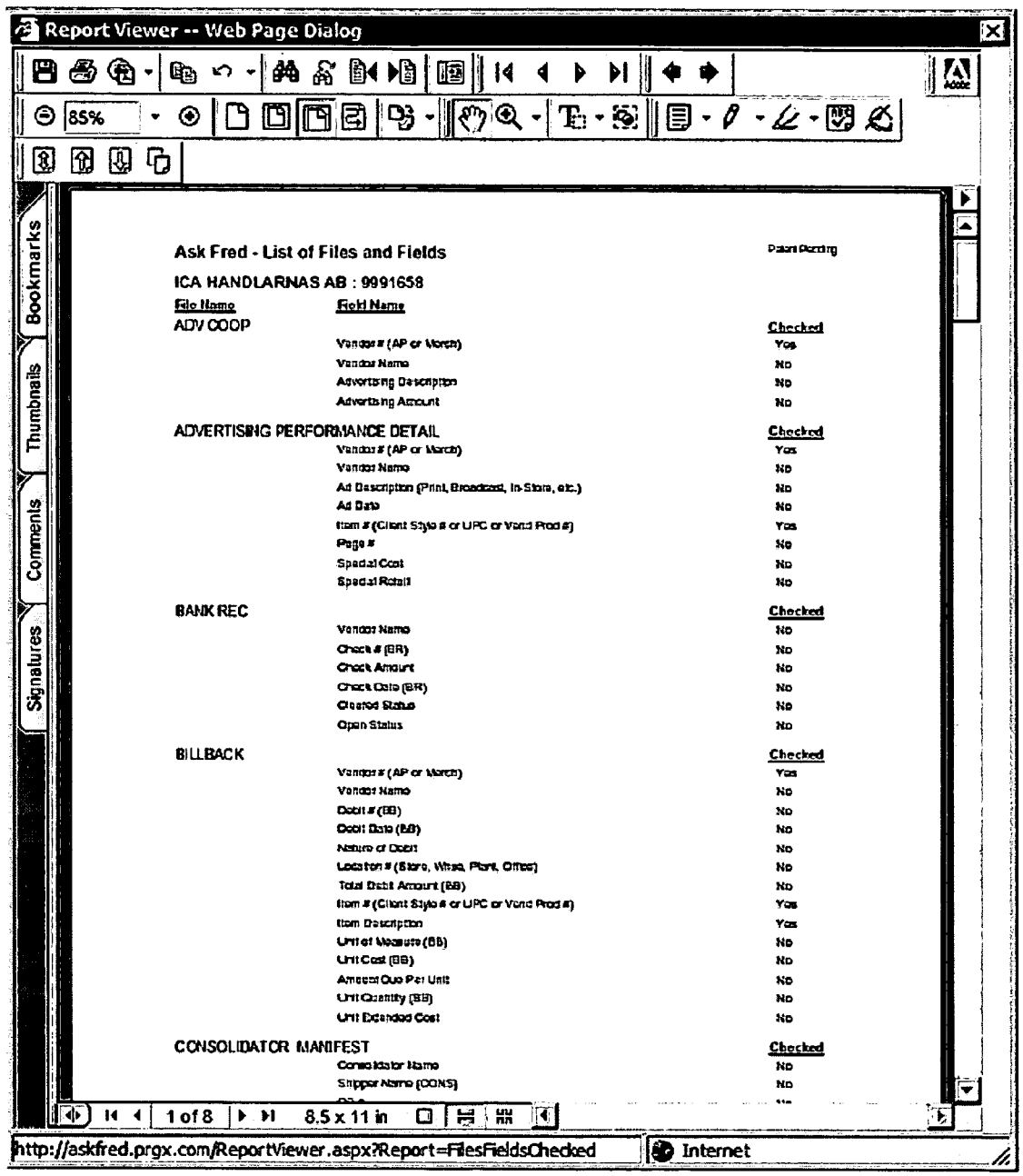
Figure 18:
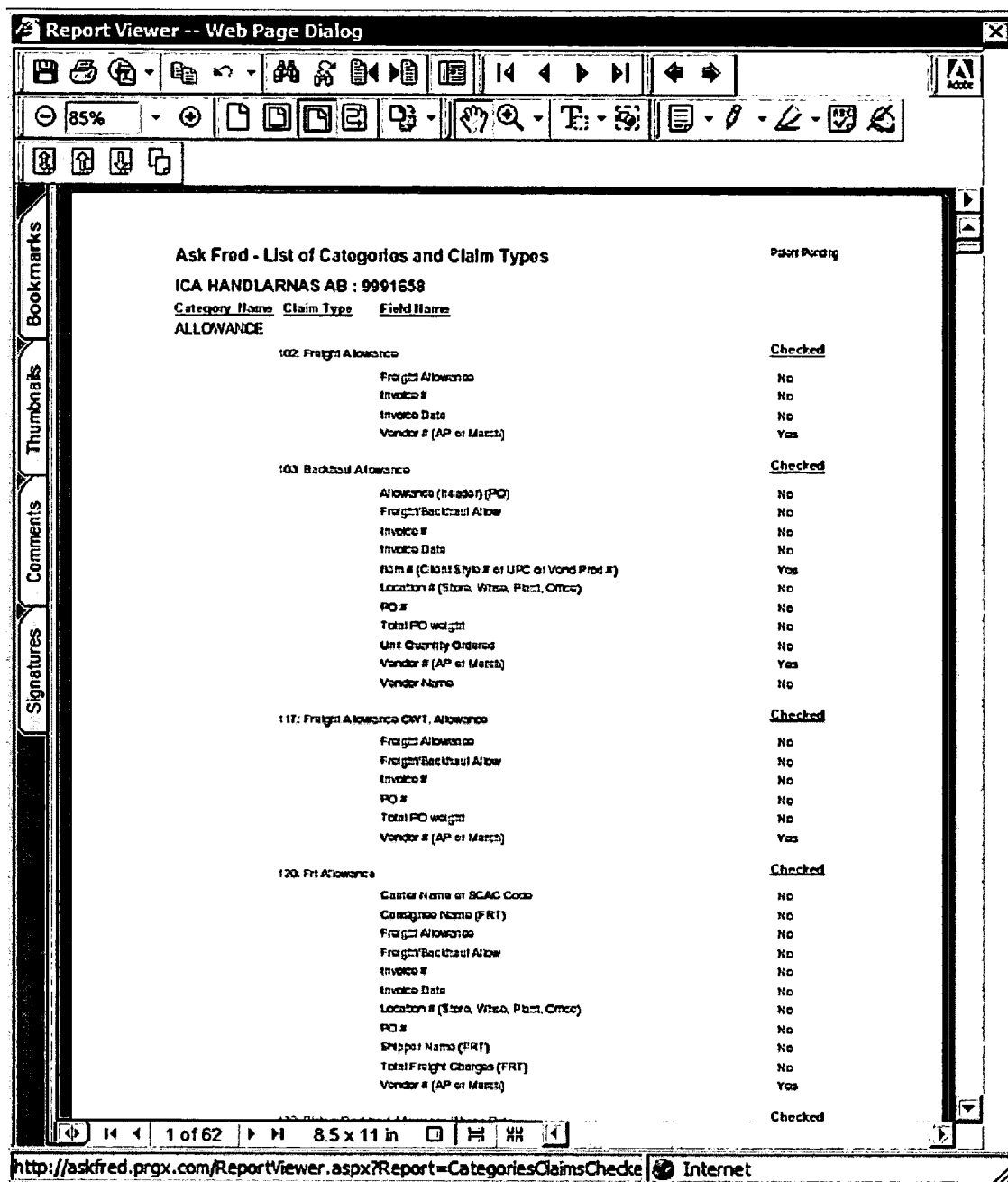

The user also has the option to generate reports. By selecting the report button 140 of the menu bar 66, a listing of available reports is presented to the user. While any number of standardized or customized reports is possible, the present embodiment includes four reports, as illustrated in FIG. 14. The Matching Claims—Summary report lists for each potential claim type listed in the project results the claim type category, claim type code, claim type description and the overall number of selected field that are missing in the client data. An example of such as report is provided in FIG. 15. The Matching Claims—Detail report lists for each potential claim type listed in the project results the information from the Summary report but it breaks down the selected fields needed for the claim type and indicates which fields are found or missing in the client data. An example of such a report is provided in FIG. 16. The List of Files and Fields report lists the selections made by the user when generating the project by field type. An example of such a report is provided in FIG. 17. Lastly, the List of Categories and Claim Types report lists the selections made by the user when generating a project by claim type. An example of such a report is provided in FIG. 18. The report described categories of claims along with individual claim types within each category. Using this report, a user can understand the degree to which he or she can explore claim types within a given category.

Upon selecting the View button 144 associated with the desired report, the report is provided to the user. The output report can then be used to analyze the recovering audit activities. Further, the present invention could communicate its results to an auditing tool or other claims management tools for use by them.

While the present invention is described above for illustrative purposes in context of determining potential claims based on the client data sets, the present invention also may be used with reverse logic. That is, the user may start with the anticipated claims or scope of an audit and use the present invention to describe the data elements required to write those claims. In this case, the program flow may be that illustrated in FIG. 19.

Figure 19:
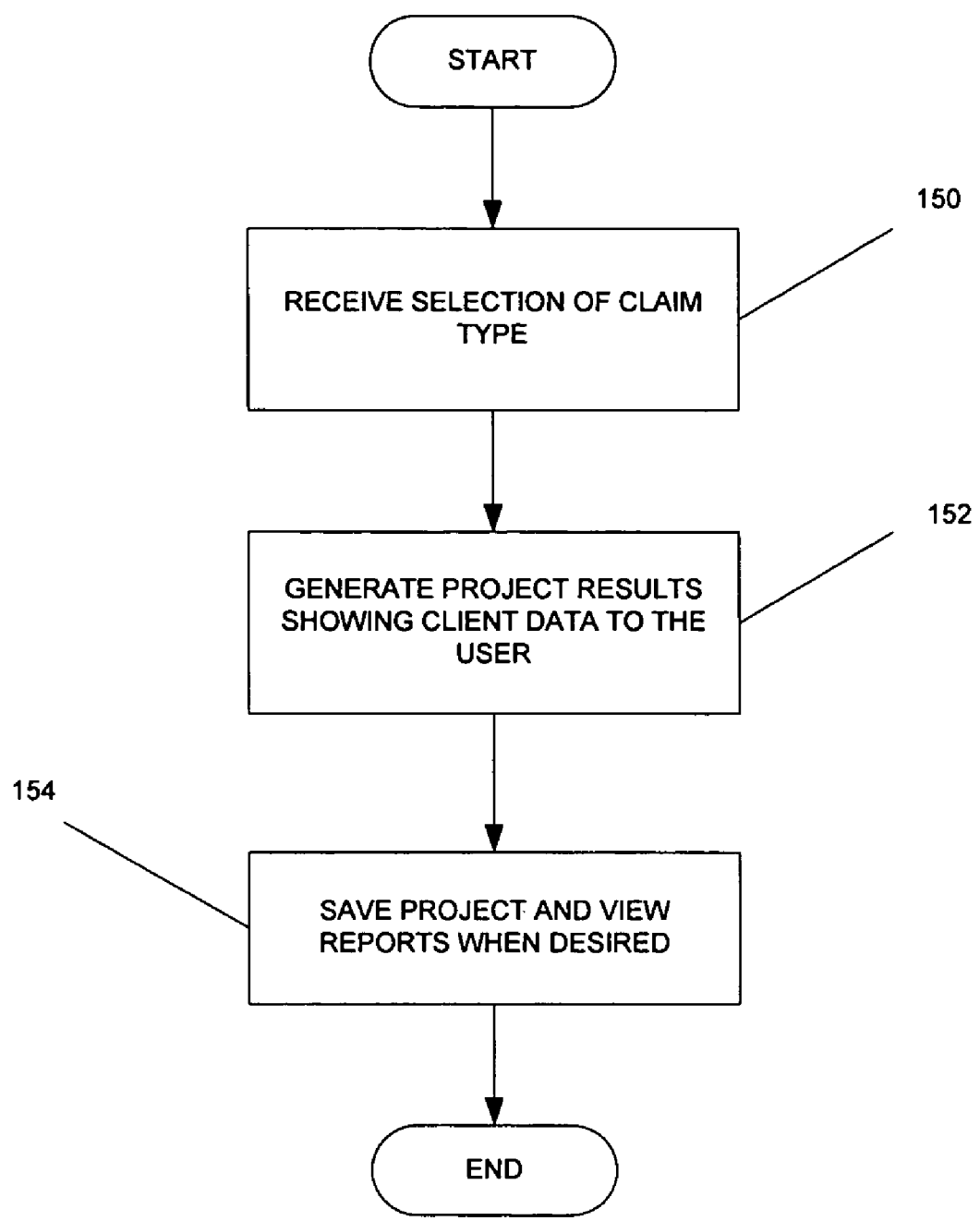
FIG. 19 is a flow diagram of the operation of an audit management system in accordance with yet another embodiment of the present invention.

FIG. 19 shows an alternative flow diagram illustrating a process implemented by the claim processing system of FIG. 1, according to one embodiment of the present invention. As shown in FIG. 19 the process begins at step 150 with the receipt of the selection of the types of claims the user wants to write. Next at step 152, the scope determination module generates a listing of client data needed to write the selected claim types. Lastly, the auditor has the options of saving the project and viewing reports, as indicated by step 154.

Further, other features that may be provided by the program include: identifying near matches; demonstration of missing data to complete claims; full and complete reporting by claim and data types; automated reporting; automated population of data; automated population of claim categories and types; predictive claims based on source system and type; predictive data elements based on source system and type; user logon security; and distributed application architecture.

Automated functionality may also be incorporated where the scope determination module would be built into data production tools where it would automatically search for data elements and configure the program accordingly. This would be done during the current data production process, hence providing the user pre-populated versions of the scope determination module.

Additionally, business logic related to typical financial systems, such as SAP or PeopleSoft, or industry characteristics may be added to the program. With this addition, the present invention may be able to predict what claim types are typically found, where the data resides to support those claim types, and how the data should be manipulated in support of those claim types. As such, the program logic could be used to predict recovery rates and opportunities for specific clients.

The present invention may have many functions within recovery auditing. The core logic built into a program in accordance with the present invention is unique in that it leverages the collective intelligence of what data is required to write claims and how that data should be organized for claim production. As such, it may play a lead role in many functions of recover auditing included, but not limited to, the following: audit scope analysis; analysis reports for auditors upon production and manipulation of source data; standard auditing tool applications; artificial intelligence auditing tool applications; claims management and presentment tool applications; recovery auditing quality assurance; predictive recoveries by industry; predictive recoveries by data set; predictive recoveries by source system; and predictive recoveries by process.

While the program has been described in the context of an illustrative embodiment, it may have broad applications across the industry. Ultimately, the program may have application in solutions for automated auditing or other completely automated solutions. Further, there are many potential applications beyond the audit recovery industry. The capability to establish industry practice rules that may be used to predict service delivery scope and application could provide the basis for artificial intelligence in many service- and analytics-based industries. The logic of the present invention to provide predictive outputs may have many uses beyond recovery auditing.

Many modifications and other embodiments of the inventions set forth herein will come to mind to one skilled in the art to which these inventions pertain having the benefit of the teachings presented in the foregoing descriptions. Thus, it will be appreciated by those of ordinary skill in the art that the present invention may be embodied in many forms and should not be limited to the embodiments described above. Therefore, it is to be understood that the inventions are not to be limited to the specific embodiments disclosed and that modifications and other embodiments are intended to be included within the scope of the present invention. Although specific terms are employed herein, they are used in a generic and descriptive sense only and not for purposes of limitation.

That which is claimed:

1. A computer-based method for determining possible claim types based on available data elements in a recovery audit comprising:
    providing a database including claim types and data elements, wherein relationships between the claim types and data elements are defined;
    providing a list of data elements to a user;
    receiving input identifying at least two data element available for a recovery audit;
    determining what claim types can be written based on the data elements identified;
    receiving input identifying a number of allowable missing data elements for identifying potential claims;
    determining what additional claim types require a number of missing data elements equal to or less than the number received; and
    presenting the additional claim types to the user.

2. The method of claim 1, further comprising generating a report identifying the claim types that can be written.

3. The method of claim 1, further comprising identifying a data element not identified but needed to write at least one of the additional claim types.

4. The method of claim 1, wherein the input providing said at least two data elements is by file type.

5. The method of claim 1, further comprising providing claim details for a claim type.

6. The method of claim 1, wherein presenting comprises displaying.

7. The method of claim 1, wherein presenting comprises printing a report.

8. A computer-based method for determining required data elements for a recovery audit based on identified claim types, comprising:
    providing a database including claim types and data elements, wherein relationships between the claim types and data elements are defined;
    providing a list of claim types to a user;
    receiving input identifying at least two claim types desired for a recovery audit;
    determining what data elements are required to write the identified at least two claim types;
    receiving input identifying a number of allowable missing data elements for identifying potential claims not identified by the user;
    determining what additional claim types require a number of missing data elements equal to or less than the number received; and
    presenting the additional claim types to the user.

9. The method of claim 8, wherein the input providing said at least two claim types is by file type.

10. The method of claim 8, further comprising providing claim details for a claim type.

11. The method of claim 8, wherein presenting comprises displaying.

12. The method of claim 8, wherein presenting comprises printing a report.

13. A computer-based system that determines claim types that can be written in a recovery audit, comprising:
    a database including claim types and data elements, wherein relationships between the claim types and data elements are defined;
    a scope determination module that determines claim types that can be written based upon data fields identified by a user and the relationships between the claim types and data elements;
    a web server that sends the potential claims to a remote computing device;
    wherein the scope determination module receives input identifying a number of allowable missing data elements and determines what additional claim types require a number of missing data elements equal to or less than the number received; and
    sends a list of the additional claim types to a user device that presents the additional claim types to the user.

14. The system of claim 13, wherein the scope determination module identifies a data element not identified but needed to write at least one of the additional claim types.

15. The system of claim 13, wherein the client device displays the additional claim types.

16. The system of claim 13, wherein the client device prints the additional claim types.

* * * * *